(12) United States Patent
Barton et al.

(10) Patent No.: US 6,744,915 B1
(45) Date of Patent: Jun. 1, 2004

(54) IMAGE IDENTIFICATION APPARATUS AND METHOD OF IDENTIFYING IMAGES

(75) Inventors: Mark Barton, Bristol (GB); Jonathan Thorpe, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 572 days.

(21) Appl. No.: 09/657,756

(22) Filed: Sep. 8, 2000

(30) Foreign Application Priority Data

Sep. 9, 1999 (GB) .............................. 9921329

(51) Int. Cl.⁷ ................................................ G06K 9/00
(52) U.S. Cl. ........................ 382/161; 382/122; 382/123; 382/188; 382/189; 382/203
(58) Field of Search .................. 382/119–122, 156–158, 382/179, 181, 186–190, 203

(56) References Cited

U.S. PATENT DOCUMENTS

| | | | | |
|---|---|---|---|---|
| 5,121,441 A | * | 6/1992 | Chefalas et al. ............. | 382/109 |
| 5,577,135 A | * | 11/1996 | Grajski et al. ............... | 382/253 |
| 5,592,565 A | * | 1/1997 | Shojima et al. .............. | 382/185 |
| 5,710,916 A | | 1/1998 | Barbara et al. | |
| 5,812,698 A | * | 9/1998 | Platt et al. ................... | 382/186 |
| 5,832,108 A | * | 11/1998 | Fukita et al. ................ | 382/159 |
| 6,430,308 B1 | * | 8/2002 | Ogawa et al. ............... | 382/119 |

* cited by examiner

Primary Examiner—Bhaves M. Mehta
Assistant Examiner—Gregory Desire
(74) Attorney, Agent, or Firm—Frommer Lawrence & Haug LLP; William S. Frommer; Bruno Polito

(57) ABSTRACT

An image identification apparatus for identifying an image from a sequence of spatial samples generated in response to a hand drawn representation of the image, the image identification apparatus comprising a segment processor arranged in operation to determine from the spatial samples stroke data representative of strokes performed in drawing the hand drawn representation of the image, a stroke pre-processor which is arranged in operation to generate parameter data from the sequence of spatial samples and the determined stroke data of the hand drawn representation, and an image identifier coupled to the stroke pre-processor which is arranged in operation to identity the image from the parameter data. The image identification apparatus finds application in many fields, including identifying hand drawn images for generating a story board from pre-generated images.

30 Claims, 5 Drawing Sheets

Key:  ---- Original Data
      -·-·- Rate of change
      ——— Filtered Data

*Fig. 10(b)*

| QUADRANT | NUMBER OF STROKE BEGINNINGS / ENDS |
|---|---|
| Upper left | 2 |
| Upper right | 2 |
| Lower left | 2 |
| Lower right | 2 |

IMAGE IDENTIFICATION APPARATUS AND METHOD OF IDENTIFYING IMAGES

BACKGROUND OF THE INVENTION

1. Field of the Invention

The present invention relates to image identification apparatus and methods of identifying images. More particularly the present invention relates to apparatus and methods for identifying images from hand drawn representations of the images.

2. Description of the Prior Art

There are many ways in which images may be created. Conventionally, an author or artist may draw a representation of the image using any appropriate means such as pencils, pens or other drawing equipment. An artist may also produce an image using a computer running a drawing application program which provides a facility for creating images and pictures by selecting pre-defined elements such as boxes, lines and circles which may be positioned, sized and shaped using a computer mouse. Furthermore to reduce a time required to generate an image, the computer may be provided with a library of pre-generated images which may be selected and copied into a picture to produce a desired scene. The images may be for example parts of or complete pictures, designs for articles or representations of a scene of a play, television programme or film.

In the field of character recognition, images representing characters from an alphabet are recognised and the character from this alphabet is generated in response to input representations of those characters. An example of this is provided in a disclosure entitled "Neural Network Classifiers for Optical Chinese Character Recognition" by R. Romero, R. Berger, R. Thibadeau and D. Touretsky of the Imaging Systems Lab., Robotics Institute, Carnegie Mellon University published on the Internet at http://www-cgi.cs.cmu.edu. Furthermore the input representations may be hand drawn. In this case to assist in identifying the image, the hand drawn representation may be segmented into a number of different strokes of a pen which were performed in drawing the representation. This is disclosed in an article entitled "Pen-tip velocity in Handwriting", published on the Internet at http://hwr.nici.kun.nl/recog/hwr-tutor/veocity.html, copyright Lambert Schomaker, Apr. 1, 1996.

Generally it is desirable to provide a facility for generating an image from a hand drawn representation of the image in an efficient manner. This is appropriate, for example, during early stages of expressing ideas and initial thoughts for a picture. design or scene, where creative ideas are readily expressed as hand drawn representations.

SUMMARY OF THE INVENTION

According to the present invention there is provided an image identification apparatus for identifying an image from a sequence of spatial samples generated in response to a hand drawn representation of the image, the image identification apparatus comprising a segment processor arranged in operation to determine from the spatial samples stroke data representative of strokes performed in drawing the hand drawn representation of the image, a stroke pre-processor which is arranged in operation to generate parameter data from the sequence of spatial samples and the determined stroke data of the hand drawn representation, and an image identifier coupled to the stroke pre-processor which is arranged in operation to identify the image from the parameter data.

It is known that a drawing processor may be arranged in use to produce a sequence of spatial samples in response to a hand drawn representation of an image. However recognising an image from the spatial samples presents a technical problem for an image identifier. By providing a segment processor which operates to receive the spatial samples and to determine from the spatial samples stroke data corresponding to the strokes which were used in drawing the hand drawn representation of the image, a set of data produced by combining the stroke data with the spatial samples from which an image may be identified is substantially reduced with respect to a data set formed from the spatial samples alone. Thus an image can be more easily identified from the smaller data set formed by combining the stroke data with the spatial samples. The number of strokes performed in creating the hand drawn representation which may be included in the stroke data provides an indication of the image. For example, a triangle will consist of three strokes, whereas a square will consist of four strokes.

The stroke pre-processor produces the parameter data which represents the data set from which the image may be identified. The stroke pre-processor therefore provides a particular advantage in that by combining the determined strokes with the spatial samples the data set produced is in a form in which a corresponding image can be more easily identified by the image identifier.

There are various ways in which a hand drawn representation may be created and from which a sequence of spatial samples representative of the image may be generated. The spatial samples are samples of the position of a drawing tool with reference to predetermined spatial co-ordinates. Although the image identification apparatus may receive a sequence of spatial samples which have been generated from some other means, preferably the image identification apparatus may include a drawing processor which may be connectable to a drawing tool for use in creating the hand drawn representation of the image, the sequence of spatial samples being generated in accordance with movement of the drawing tool.

The drawing processor may be any means by which the spatial samples may be produced from the hand drawn representation. Although the drawing processor generates spatial samples in response to the hand drawn representation of the image, there remains the requirement for accurately determining from the spatial samples the strokes which were performed in producing the hand drawn representation of the image. Advantageously, therefore the segment processor of preferred embodiments may be arranged to determine the stroke data by generating from the spatial samples relative direction information representative of a relative direction of the drawing tool, to determine from the relative direction information a number of changes of direction of the tool and to determine the strokes performed in creating the representation in accordance with the number changes in direction. To facilitate the detection of the number of changes of direction of the drawing tool, the segment processor may further operate to generate from the relative direction information a rate of change of direction of the tool and determine a number of peaks in the rate of change of direction of the tool, the number of peaks being indicative of the number of changes of direction. To provide a further improvement in the confidence with which the stokes used to produce the hand drawn representation are detected, the segment processor may be provided with a filter through which the relative direction information may be passed, the number of times the tool changes direction being determined from the filtered relative direction information.

The spatial samples may be samples of the position of a drawing tool with reference to predetermined spatial co-ordinates. However the spatial samples may be provided with a temporal reference corresponding to a relative time at which the samples are generated. As such, the segment processor may in preferred embodiments operate to determine the strokes performed in creating the hand drawn representation by generating from the temporally referenced spatial samples relative speed information representative of a relative speed of the drawing tool with respect to time, determining from the relative speed information changes of speed of the tool, and determining the strokes of the hand drawn representation in accordance with the number of changes of speed. A further improvement in determining the number of strokes which are used to generate the hand drawn representation of the image may be provided by generating from the relative speed information a rate of change of the speed of the tool and identifying when the rate of change of speed reaches zero, the number of times the drawing tool changes speed being indicated from which of the identified zeros in the rate of change of speed corresponds to minimum speeds. To further improve a probability in correctly detecting and resolving the strokes used to generate the hand drawn representation of the image, the segment processor may have a filter through which the relative speed information is passed, the number of times the tool changes speed being determined from the filtered relative speed information.

A further improvement is provided in the probability of correctly detecting the strokes performed in drawing the hand drawn representation by combining the relative direction information and the relative speed information. Therefore by correlating the change in direction with the decreases in speed, a more accurate representation of the strokes performed in creating the hand drawn representation of the image is provided.

A particular advantage is provided in the process of identifying the image from the hand drawn representation by the stroke pre-processor which combines the identified strokes of the hand drawn representation with the spatial samples so that a data set defining the hand drawn representation is substantially reduced to that which would be required to define the image without providing the stroke pre-processor. In a preferred embodiment the stroke pre-processor may be arranged to determine a start and end point for each of the strokes, to form an outer boundary of the hand drawn representation from the start and end points of the strokes, to normalise the hand drawn representation from the outer boundary with respect to a pre-defined reference unit by proportionally adapting the spatial samples and to generate the stroke parameter data from the normalised hand drawn representation. By normalising the hand drawn representation with respect to the pre-defined reference unit, an image may be identified independently of a size which an artist may draw the image. In this way therefore an improvement is provided to the image identification apparatus in that the same image may be identified from different hand drawn representations of this image. This is particularly advantageous because different artists may draw images to different sizes, and furthermore the artist is not constrained to draw the image within a particular unit.

In a preferred embodiment the stroke parameter data may include at least one of a number of the strokes used to generate the hand drawn representation a centre of gravity of the hand drawn representation, a mean vector of the hand drawn representation, a normalised vector of the hand drawn representation, the length of the hand drawn representation and the balance of the hand drawn representation.

A further improvement to the image identification apparatus is afforded by arranging for the image processor to access a data store storing a plurality of images, and to indicate which of the plurality of images corresponds to the hand drawn representation of the image in accordance with the parameter data. Therefore although the image identifier may provide a reference indication of the image, an advantage is provided to the image identification apparatus by providing a data store which has a plurality of images pre-stored and from which the hand drawn representation of the image may be identified.

In a preferred embodiment the image identifier may be a neural network which is trained with stroke parameter data corresponding to the pre-stored images. More particularly, in a preferred embodiment the neural network may be a multi-layer perceptron, an input layer having a number of inputs corresponding to the number of stroke parameters formed from the parameter data, each of the stroke parameters being fed to a corresponding one of the layers.

In order to provide artists with an indication of the selected image, the image identifier may be arranged in operation to feed data representative of the indicated image to a visual display means connectable to the apparatus to provide a representation of the image.

The image identification apparatus may find application in several fields. However in a preferred embodiment, the image identification apparatus forms part of a story board production station, in which story boards for audio visual productions may be efficiently created from a set of pre-stored images.

According to a further aspect of the present invention there is provided a method of identifying an image from a sequence of spatial samples generated in response to a hand drawn representation of the image, the method comprising the steps of resolving, from the samples, strokes performed in creating the hand drawn representation of the image, generating parameter data by associating the spatial samples with the resolved strokes of the hand drawn representation, and identifying the image from the parameter data.

Further aspects and features of the present invention are provided and illustrated with reference to the appended claims.

BRIEF DESCRIPTION OF THE DRAWINGS

Embodiments of the present invention will now be described by way of example only with reference to the accompanying drawings wherein.

DESCRIPTION OF A PREFERRED EMBODIMENT

Identifying an image from a hand drawn representation of the image is a process which finds application in several fields, such as image recognition and hand writing character recognition. For example generating an image from a hand drawn representation of the image can provide a way of universally communicating in that even if one does not speak a language within a country one can draw a desired article from which an image of the article can be produced and from which the appropriate word in that language can be searched. A further example application is in the form of handwriting recognition in which characters of an alphabet are identified from hand drawn or written representations. Similarly for example a facility for generating an image from a hand drawn representation of that image can provide an efficient way of generating a complicated scene for a picture or illustration using a plurality of more complicated but pre-stored images. An example application to illustrate and facilitate understanding of an example embodiment of the present invention is a story board generation station which provides a means for artists to generate a story board representation of a scene for a film, advertisement, documentary or the like. As will be appreciated, the story board production station according to an example embodiment of the present invention is provided with a particular advantage in that persons who are not provided with a particular ability and skill at drawing may generate accurate and complex visual representations of story boards regardless of artistic ability. An example embodiment of the present invention is shown in FIG. 1 which provides an illustration of the story board production station.

Figure 1:
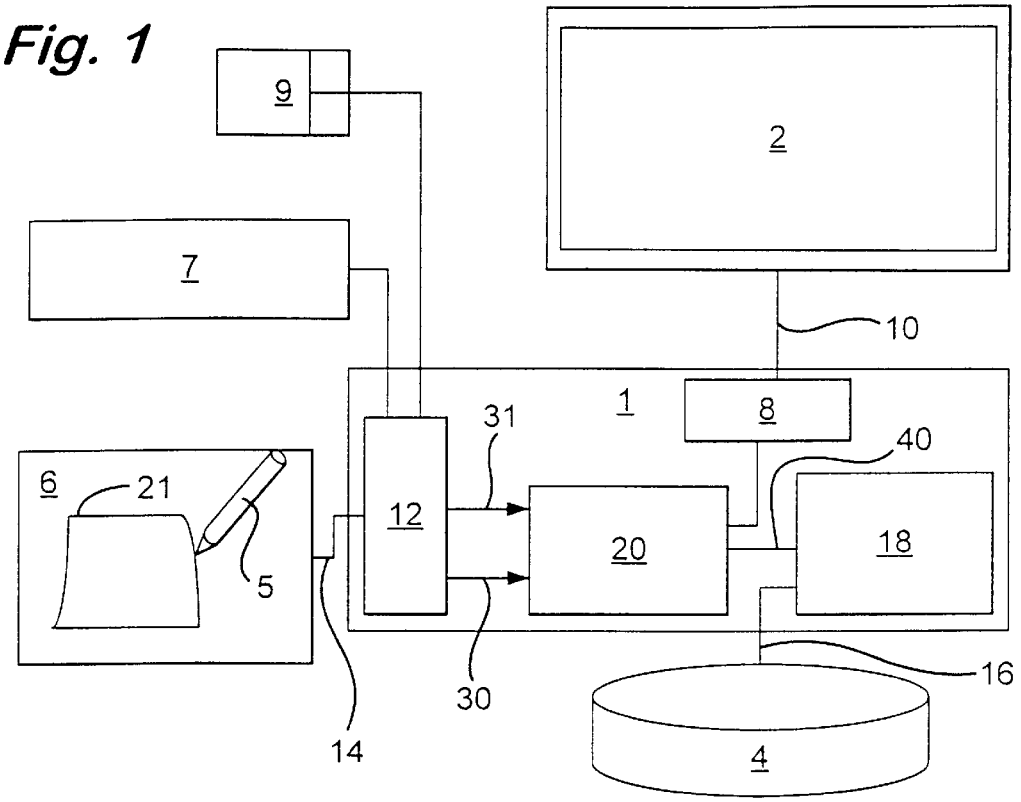
FIG. 1 is a schematic block diagram of a story board generation station.

In FIG. 1 the story board editing station is shown to comprise a data processor 1, a visual display unit 2, a data store 4 and a pen and tablet drawing tool 6. The visual display unit 2 is connected to a visual display unit (VDU) driving processor 8 within the data processor 1 via a connecting channel 10. The pen and tablet drawing tool 6 is connected to an interface processor 12 within the data processor 1 via a conductor 14. Also connected to the interface processor 12 is a keyboard 7 and a computer mouse 9. The data store 4 is connected to a data store access processor 12 via a conductor 16. The VDU graphics driver 8, the interface processor 12 and the data store access processor 18 are all coupled to a control unit 20 within the data processor 1. The control unit 20 controls the operation of the story board editing station, by controlling the data store 4, the visual display unit 2 and by processing information received from the drawing tool 6. A better understanding of the operation of the story board editing station shown in FIG. 1 may be gathered from a more detailed explanation of the control processor 20, which will be provided in the following paragraphs with reference to FIG. 2 which provides an example embodiment of the control processor 20.

Figure 2:
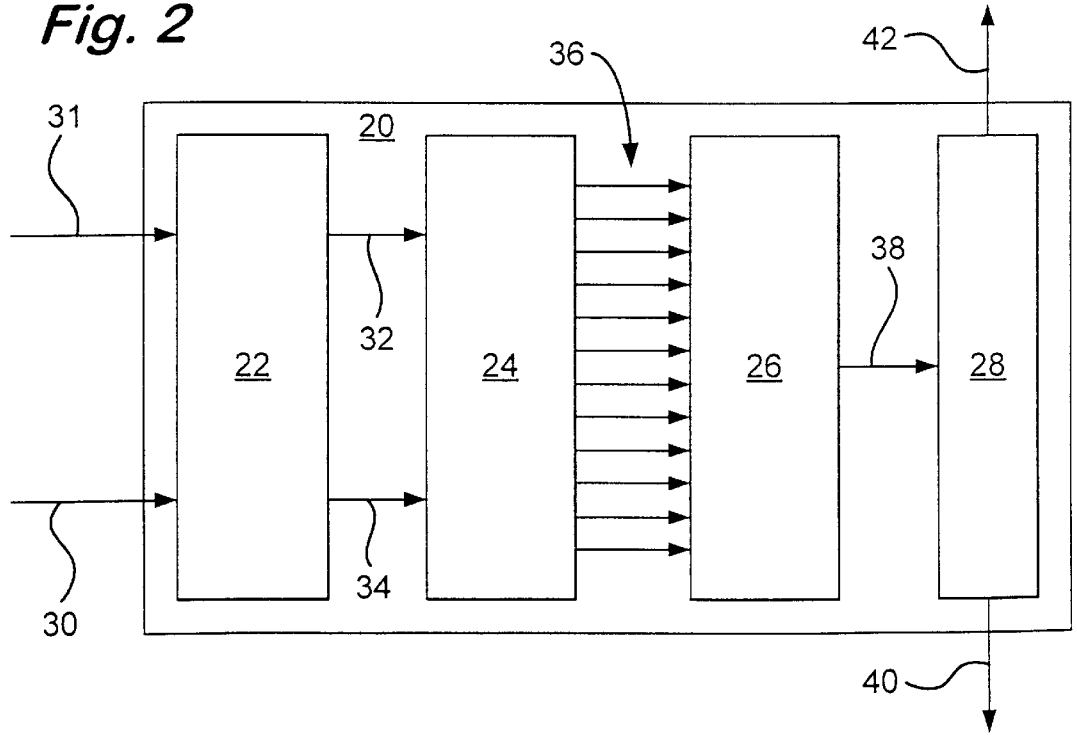
FIG. 2 is a schematic block diagram of a control unit which appears within a data processor of the story board station shown in FIG. 1.

In FIG. 2 the control processor 20 is shown to comprise a segment processor 22, a stroke pre-processor 24, an image identifier 26 and an interface controller 28. As illustrated in FIG. 1, a representation of a square 21 has been drawn by a user of the editing station using the pen 5 on the tablet of the drawing tool 6. From this drawing spatial samples are produced which are provided with a temporal reference. The spatial samples provide discrete samples of the co-ordinates of the pen within an x, y plane formed by the tablet of the drawing tool 6. The segment processor 22 receives data representative of the temporally referenced spatial samples from the drawing tool 6 from an input channel 30. As will be explained in more detail shortly, the segment processor processes the temporally referenced spatial samples and generates from these samples data representative of a number of different strokes which were used in producing a hand drawn representation of an image. This data which will be generally referred to as stroke data is then fed to the stroke pre-processor 24 via a conductor 34. The temporally referenced spatial samples of the hand drawn representation which were received from the connecting channel 30 are then fed to the stroke pre-processor via a second connecting channel 32. The stroke pre-processor 24 operates to combine the stroke data with the temporally referenced spatial samples to form a predetermined set of parameters which are representative of and describe the strokes which were used to produce the hand drawn representation of the image. In the example embodiment shown in FIG. 2, twelve stroke parameters are generated although it will be appreciated that any number of stroke parameters could be used. Data representative of each of the twelve stroke parameters termed stroke parameter data are then fed via one of twelve separate parallel conductors 36 to the image identifier 26.

The image identifier 26 receives a set of stroke parameter data from the parallel conductors 36 for each hand drawn representation of an image produced on the drawing tool 6 by a user of the story board editing station. The image identifier 26 processes the stroke parameter data and produces a reference indication which may be a series of digits indicative of which of a plurality of images corresponds most closely to the stroke parameter data. The reference indication is produced at an output conductor 38 and fed to the interface processor 28. The interface processor 28 is connected via a first bi-directional connecting channel 40 to the data store access processor 18 and via a second connecting channel 42 to the VDU driving processor 8. The data store access processor 18 accesses the data store and retrieves image data representative of one of the plurality of images stored in the data store 4. The image data selected by the data store access processor 18 corresponds to one of the plurality of pre-stored images which corresponds to the reference indication generated by the image identifier 26. The image data is fed via the connecting channel 40 to the interface control processor 28. The interface control processor 28 then feeds the image data to the VDU driver processor 8 via the connecting channel 42. The VDU driving processor 8 operates to convert the image data into signals for driving the visual display unit 2. The signals are fed via the connecting channel 10 to the visual display unit 2 which serves to display the image selected from the data store 4 to the user of the story board editing station.

A better appreciation and understanding of the operation of the control processor 20 may be gathered from a more detailed explanation of the function of the segment processor 22, the stroke pre-processor 24 and the image identifier 26 provided in the following paragraphs. As already explained the drawing tool 6 operates to produce temporally referenced spatial samples in accordance with the movement and position of the pen 5 of the drawing tool 6 which are produced for the hand drawn representation of the image. These temporally referenced spatial samples could be generated in any convenient way such as using the computer mouse 9, the keyboard 7 or any tool which allows an author to draw a representation of the desired image and from which spatial samples can be produced. In the example embodiment of the present invention the drawing tool 6 has a pen 5 which when drawn on the tablet 6 produces the temporally referenced spatial samples in accordance with the movement of the pen 5. An example of such a pen and tablet drawing tool is produced by a company known as Wacom. More information of such pen and tablet products may be found at the web address www.wacom.com.

Figure 3:
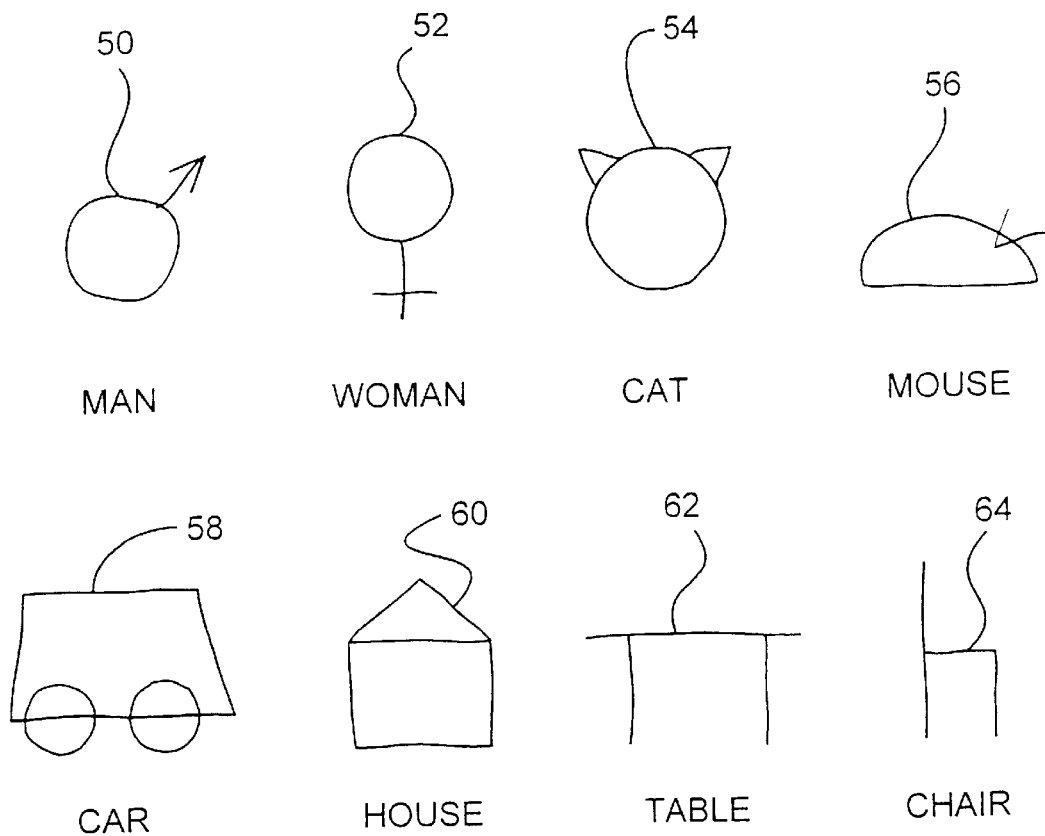
FIG. 3 is an illustrative representation of eight example hand drawn representations of images.

Using the pen and tablet arrangement, the user of the editing station shown in FIG. 1 may draw representations of the images which are required to build a scene for a story board. Examples of such images are shown in FIG. 3. In FIG. 3 the examples given of hand drawn representations of images include a man 50, a women 52, a cat 54, a mouse 56, a car 58, a house 60, a table 62 and a chair 64. Some of these examples of gestures which would be useful in a story boarding environment can be drawn in a single stroke. However others of these example gestures are "multi-stroke", which means that several individual pen actions are typically required to produce these hand drawn representations corresponding to the images. Such hand drawn representations or parts thereof are referred to in the following paragraphs as gestures.

As an illustrative example of the operation of the control processor 20, the representation of the square 21 drawn by the user as shown in FIG. 1 will be used to illustrate the operation of the control processor 20. In order to identify images from hand drawn representations of these images, the control processor 20 operates to identify a set of pen strokes which are formed by the user to draw the representation. These pen strokes may be identified from a process known as stroke capture and segmentation of the hand drawn representations from which the stroke data is produced. The spatial samples are then pre-processed in accordance with the stroke data and parameter analysis of the hand drawn representation produces parameter data. The hand drawn representation is then identified from the parameter data. Each of these three steps is performed respectively by the segment processor 22, the stroke pre-processor 24 and the image identifier 26.

Figure 4:
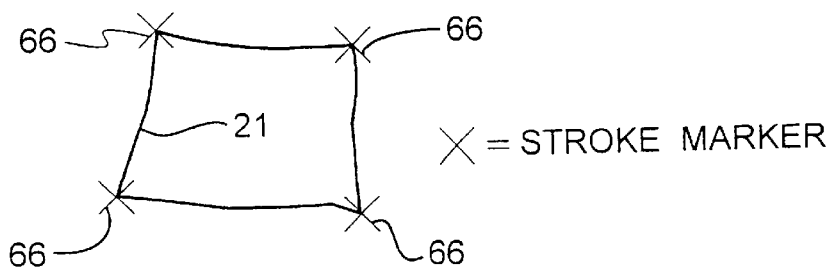
FIG. 4 is an illustration of a hand drawn representation of a square.

In FIG. 4 the hand drawn representation of the square 21 is shown with reference to stroke markers 66. These stroke markers 66 are produced by the segment processor 22, during the first step of stroke capture and segmentation, by analysing the temporally referenced spatial samples to identify the start and end of strokes of the pen 5. To perform stroke capture and segmentation the segment processor 22 of preferred embodiments, which is shown in more detail in FIG. 5, operates to identify the strokes which make up the hand drawn representation using one or both of two analysis processes.

Figure 5:
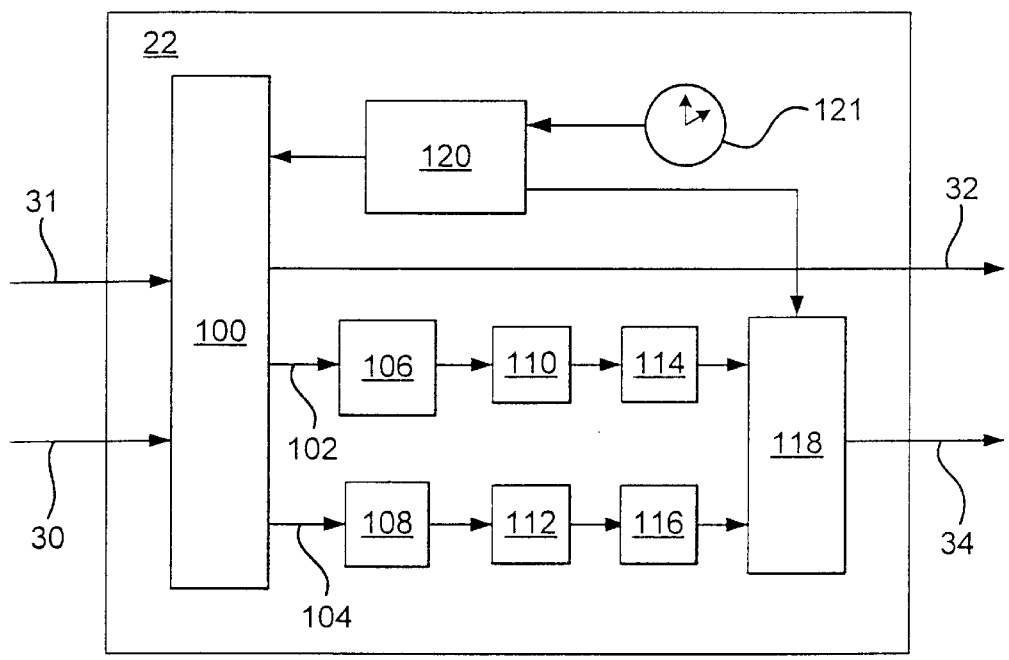
FIG. 5 is a schematic block diagram of a segment pre-processor which is shown in FIG. 2.

As shown in FIG. 5, the segment processor 22 is shown to comprise a cache memory unit 100, which is arranged to receive the spatial samples from the drawing tool 6 via the connecting channel 30 from the interface processor 12. Connected to the cache memory unit 100 via first and second output conductors 102, 104 is a direction processor 106 and a speed processor 108. Connected to the direction processor 106 and the speed processor 108 are first and second low pass filters 110, 112 respectively. Connected to an output of each of the low pass filters 110, 112 is a first and a second segment estimator 114, 116. Connected to an output of the first and the second segment estimators 114, 116 is a segmenter 118 which operates to produce at the connecting conductor 34 the stroke data which serves to identify the strokes which were used to drawn the hand drawn representation of the image. The segment processor 22 is also provided with a controller 120 which is connected to the cache memory unit 100 and the segmenter 118 and serves to control the operation of the segment processor.

The segment processor 22 operates to identify the strokes which were used to generate the hand drawn representation of the image, and to generate the stroke data identifying these strokes which includes the start and end point of the strokes. The two processes by which the strokes of the hand drawn representation may be identified are based on a relative direction of the pen 5, and an analysis of the relative speed of the pen 5. After a trigger signal is received, the controller 120 operates to read the spatial samples out from the cache memory unit 100. This trigger signal can be provided in a number of different ways. For example, the drawing tool 6 can be arranged to generate a signal which indicates that the pen 5 has left the drawing tablet of the drawing tool 6. This is detected by the interface processor 12 and accordingly generates a trigger signal on the control channel 31. A further example would be if the user entered a pre-determined key from the keyboard 7 or a command signal from the mouse 9. These signals can also be detected by the interface processor 12 and used to generate the trigger signal on the input channel 31. A further example would be to produce a trigger signal from the controller 120 within the segment processor 22. This could for example be produced after a pre-determined amount of time has lapsed from receiving the last spatial samples within the cache memory unit 100. To measure this time lapse, a clock 121 is provided within the segment processor which provides a temporal reference for the controller 120.

Figure 6:
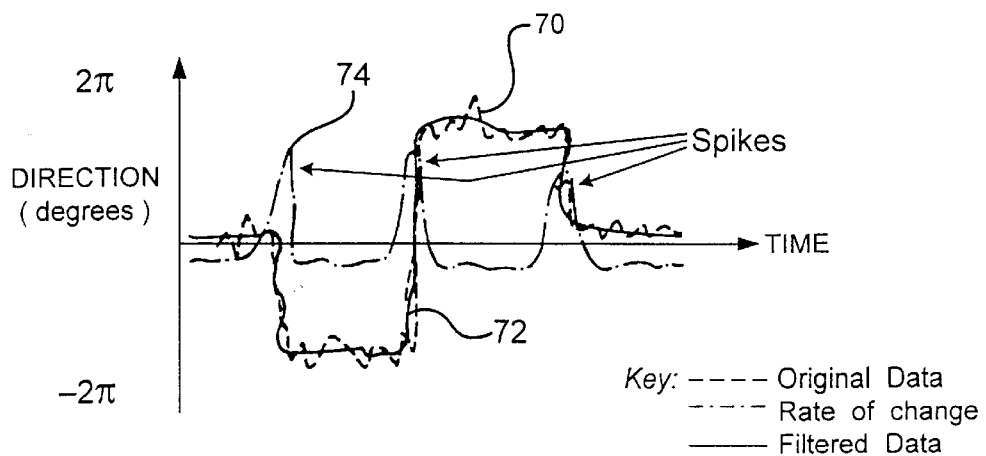
FIG. 6 presents a graphical representation of a plot of direction of a drawing tool with respect to time, FIG. 7 provides a graphical representation of a plot of speed of a drawing tool with respect to time, FIG. 8 provides a graphical representation of a hand drawn square in a unit square.

Having received the trigger signal, the controller 120 feeds the spatial samples from the cache memory 100 to the direction processor 106 and the speed processor 108. The direction processor 106 operates to identify the strokes used in producing the hand drawn representation by analysing the spatial samples. This analysis produces data representing a plot of the relative direction of travel of the pen with respect to time. For the example of the hand drawn representation of the square 21, a result of this analysis is illustrated in FIG. 6. In FIG. 6 a graphical representation of the direction of the pen 5 as the pen moves in drawing the square 21 is shown with respect to time. This is represented by the broken line 70.

It is possible for the user to draw a gesture in either one pen action or many actions. For the example of the hand drawn representation of the square 21, four strokes are used to make up this image. This is made up from four straight lines, which could be drawn in four separate pen actions or drawn as one continuous action. The stroke capture and segmentation process is made to be invariant to the number of actions required to draw a particular gesture, which has a fixed number of strokes. The stroke capture and segmentation process can use either a relative direction analysis or a relative speed analysis, or as in the example embodiment presented in FIG. 2, use both relative direction and speed analysis.

The cached spatial samples which represent the hand drawn image are taken and an assumption made that at corners, such as those in the square 21, there will be a detectable shift in the direction in which the pen is traveling.

Depending on the amount of data available for the gesture, the direction for each pixel is calculated using n pixels before and after the current pixel to reduce noise which may be present in the gesture. This is represented by the broken line 70, which provides a representation of the data generated at the output of the direction processor 106. This relative direction data is then passed through the first low pass filter 110, which removes noise. The filtered relative direction data is represented in FIG. 6 as a solid line 72. The filtered relative direction data is then fed to the first segment estimator 114, which determines a rate-of-change of the relative direction of the pen 70. This is represented in FIG. 6 as a second broken line made up from dots and dashes 74. Because the direction in which the pen is travelling will change rapidly at corners, the rate-of-change of direction will spike at these points. This can be seen in FIG. 6 from the second broken line 74, which has spikes 75. These spikes 75 are detected by the first segment estimator, which in the example of the hand drawn representation of the square 21, corresponds to three changes in direction representing four strokes.

Figure 7:
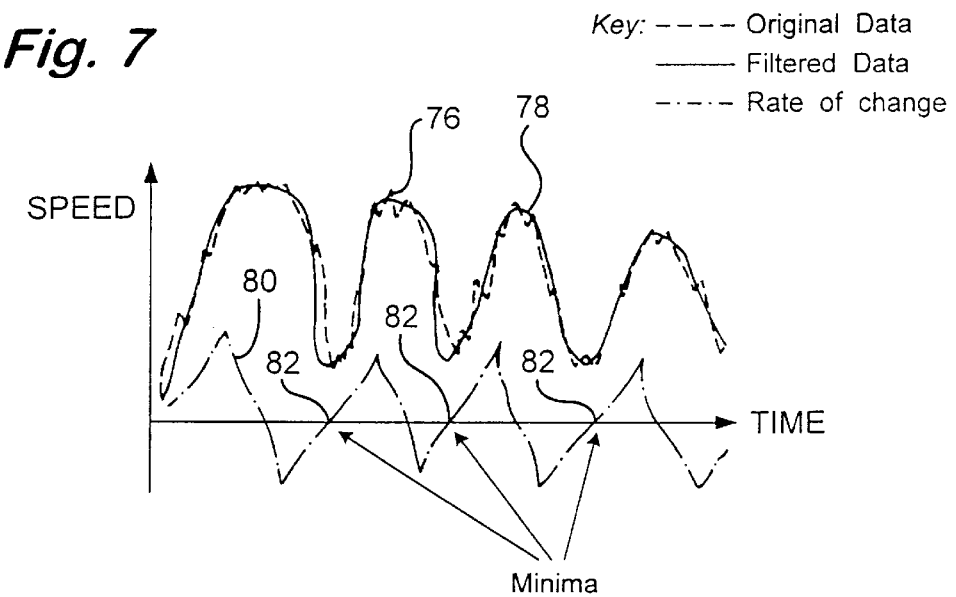

The speed processor 108, on the other hand, produces an estimation of the number of strokes and the start and end points from a relative change in speed of the pen 5. The speed processor 108 analyses the spatial samples received from the cache memory unit 100, and produces data representative of a relative speed of the pen. This is illustrated in FIG. 7, in which a graphical representation of the speed of the pen 5 as the pen moves to draw the square 44 is represented as a broken line 76. To detect the strokes which make up a hand drawn representation of an image, an assumption is made that when the user draws a gesture such as the square 21 the speed at which the pen is moving will reduce significantly at the four corners allowing the corners, and therefore the end points of each stroke, to be detected. The speed data produced by the speed processor and representative of the first broken line 76 shown in FIG. 7 is filtered to remove noise. The filtered speed data is represented by the solid line 78. The filtered speed data is then passed to the second segment estimator 116, which generates data representative of the rate-of-change of the speed. From this, zero crossing points are detected. At the zero crossing points the second differential is calculated to determine whether or not the zero crossing is a minimum or maximum, with minima corresponding to a positive second differential. If a zero crossing point corresponds to a minimum then a stroke has been located. This is represented in FIG. 7 by the zero crossing points 82, which correspond to points at which the pen decelerates at the corners of the square 21.

The estimates of the strokes which make up the hand drawn representation are fed from the first and second segment estimators 114, 116 to the segmenter 118. The segmenter 118 processes the estimates from the relative direction analysis and the speed analysis, which are compared and combined and a list produced of the locations where the gesture should be segmented into separate stokes. The segmentation into strokes is then performed from which the stroke data is produced at the connecting channel 34 which is fed to the stroke pre-processor 24. Also fed to the stroke pre-processor 24 from the cache memory unit 100 via the connecting channel 32 are the spatial samples which corresponds to the hand drawn image.

Figure 8:
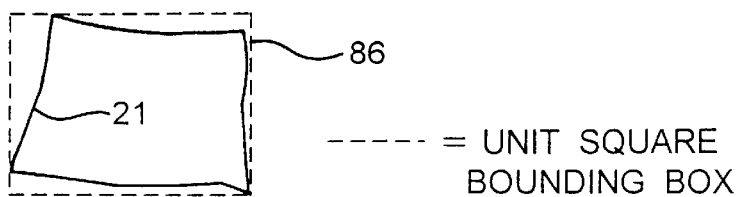

Returning to FIG. 2, the temporally referenced spatial samples and the stroke data are received by the stroke pre-processor 24. The stroke pre-processor 24 operates to calculate values for twelve pre-determined parameters. In order to calculate these parameter values, the hand drawn representation produced in accordance with the gesture is normalised with reference to a pre-determined boundary, which in the example embodiment is a unit square. The gesture is normalised by scaling the coordinates so as to fit inside the unit square bounding box. This normalisation is illustrated in FIG. 8, in which the hand drawn representation of the square is shown with reference to the unit square bounding box represented by a broken line 86.

The values for the pre-determined parameters are then calculated by the stroke pre-processor 24 using the normalised gesture to produce the parameter data. The parameters used in the example embodiment are as follows:

(1) Number of strokes—a single parameter, (2) Centre of gravity of the gesture—x, y co-ordinate,— two parameters (3) Mean vector of the gesture—x, y co-ordinate,—two parameters (4) Normalised vector of the gesture—x, y co-ordinate,— two parameters (5) Length of the gesture—a single parameter, and (6) Balance of the gesture—four parameters.

Figure 9A:
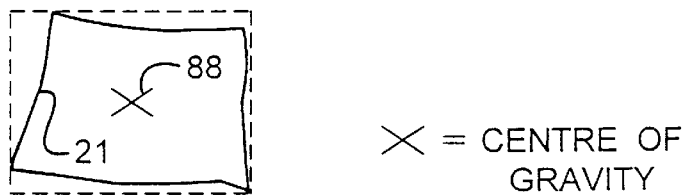
FIG. 9 provides an illustrative representation of the stroke parameters for the hand drawn representation of the square shown in FIG. 8 for (a) the centre of gravity, (b) the mean vector, and (c) the normalised vector.
Figure 9B:
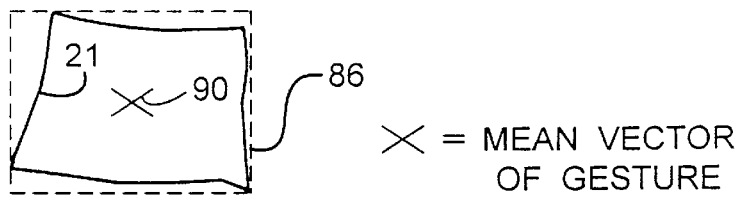
Figure 9C:
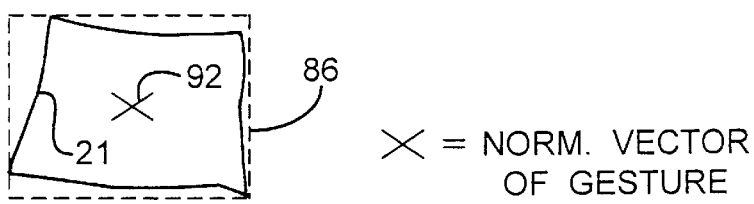
Figure 10A:
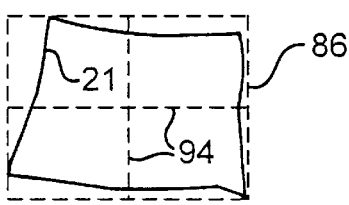
FIG. 10 provides an illustrative representation of (a) the balance of the hand drawn representation of a square and (b) a table providing the number of stroke beginnings and ends for the balance of the square.

These parameters are illustrated in FIG. 9. The parameter for the number of strokes is self-explanatory and is in effect determined by the segmentation processor 22. The centre of gravity of the gesture is calculated by summing the normalised coordinates for each pixel and dividing the result by the number of pixels. An example of this is shown in FIG. 9(*a*) in which the square 21 is shown with reference to the bounding box 86 with a cross 88 indicating a centre of gravity of the square 21. The mean vector of the gesture is calculated by summing the vector between each stroke start and finish and dividing the result by the number of strokes. An example of this is shown in FIG. 9(*b*) where a cross 90 indicates the mean vector of the gesture which defines the square 21. The parameter of the normalised vector is very similar to the parameter for the mean vector, but differs in that before the normalised vector is calculated it is normalised with respect to the centre of gravity such that it is determined in a clockwise direction around the centre of gravity. An example of this is shown in FIG. 9(*c*), in which a cross 92 provides an indication of a representation of the normalised vector. The length of the gesture is calculated by summing the distance between normalised pixel point of the gesture. The balance of the gesture is formed by dividing the unit square that bounds the normalised gesture into four quadrants. Each stroke is then examined to identify in which quadrant its beginning and end points lie. A count is then formed of the number of stroke ends in each quadrant. In FIG. 10(*a*), the square 21 is shown with reference to a dividing grid represented by broken lines 94. From the dividing grids the balance of the gesture is calculated and this is represented in the table shown in FIG. 10(*b*).

Figure 11:
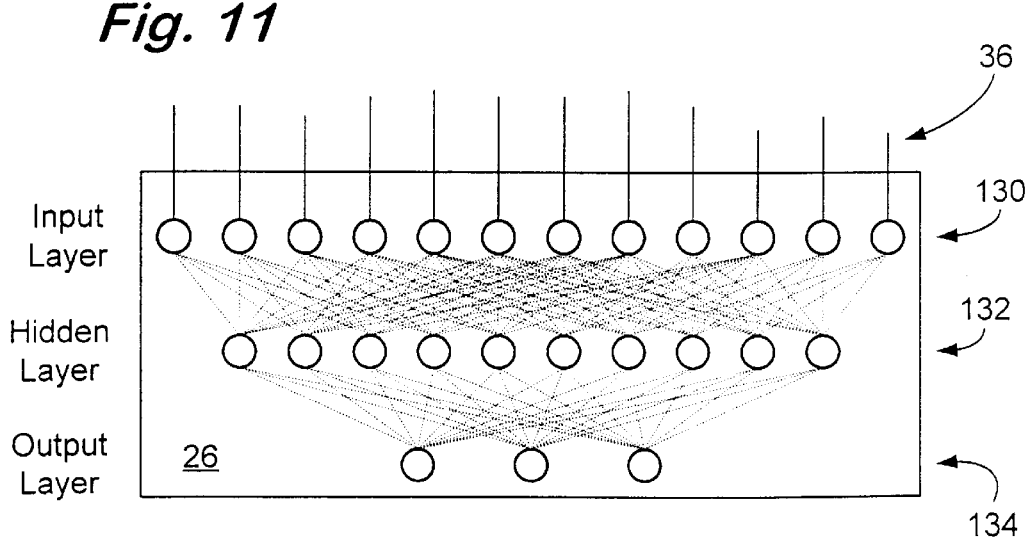
FIG. 11 is a schematic diagram representing a neural network.

Returning to FIG. 2, the twelve parameter values are fed via the parallel conductors 36 to the image identifier 26 which generates the reference indication in accordance with a most likely correspondence of the reference indication with the twelve parameter values. In FIG. 11 the image identifier 26 is shown in more detail to comprise a series of neurones in three layers which are represented as rows which forms a neural network. Neural networks are known to persons skilled in that art, although more detail is provided in a published article by D. E. Rumelhart, J. L. McClelland and the PDP Research Group (Eds.), entitled "Parallel Distributed Processing: Explorations in the Microstructure of Cognition. Volume 1: Foundations. published in 1988 by Cambridge MA: MIT Press and reprinted in Anderson and Rosenfeld. The neural network of the example embodiment is a multi layer perceptron network with twelve neurones in the input layer 130 corresponding to the twelve stroke parameters, and a hidden layer 132 consisting of ten neurones. The twelve parameters are shown connected to the twelve input neurones by the parallel conductors 36. The neurones are interconnected to form the neural network, an output layer being provided which serves to generate the reference indication of the image which corresponds to the hand drawn representation. For the example embodiment the three outputs from the neural network can classify up to eight different hand drawn images, although it will be appreciated that other numbers of images may be classified with a corresponding number of outputs. Training the network is performed off-line. This task for the example embodiment takes in the order of fifteen minutes with a training set consisting of twenty examples of each gesture from fifteen users. This corresponds to two thousand four hundred individual gestures. This represents an amount of training data required to achieve good recognition rates for any user. Preferably sufficient training data should be provided from a diverse enough range of users to train the network. However the image identifier produced according to the example embodiment is directionally invariant. For example, if a straight horizontal line is drawn as a gesture, the image identifier does not distinguish whether the line is drawn from left to right or from right to left. Directional invariance provides an advantage in that the same gesture may be drawn in a number of different stroke orders, however this precludes gestures that contain directional information.

The operation of the story board editing station shown in FIG. 1 may know be more easily understood from the foregoing explanation. In order to produce a story board an editor can draw a representation of the desired image using the drawing tool 6. The data processor 1 then processes the hand drawn representation and retrieves an image which best corresponds to the hand drawn representation and displays this on the VDU 2. By executing appropriate commands from either the keyboard 7 or the computer mouse 9, the data processor 1 can save and position the image within the screen presented by the visual display unit 2 at a desired location. The user then continues to draw other representations of the images which are retrieved from the data store and produced on the screen of the VDU. The user may correspondingly position and save the produced image at a desired location so that a scene of the story board may be produced.

A further advantage is provided to the example embodiment of the present invention by detecting when the pen 5 has left the tablet of the drawing tool 6. As already explained this is one way in which the trigger signal to indicate that the gesture forming the hand drawn representation of the image should be processed by the image identifier. When the pen 5 has left the tablet 6, the control unit immediately processes the last gesture produced and retrieves the image corresponding to this gesture form the data store 4 to be displayed on the visual display unit 2. When the image is displayed on the visual display unit 2, the user may confirm that this is the correct image by introducing commands using the keyboard 7 or the computer mouse 9, the interface processor 12, then producing control signals on conductor 31 to clear the cache memory unit 100. However if the user continues to draw using the pen 5 of the drawing tool 6, the control unit 20 adds the new spatial samples of the new gesture to those already held in the cache memory representing the previous gesture or gestures of the hand drawn representation. When the trigger signal is produced, the controller 120 in the segment processor 22 again produces the stroke data and the spatial samples, so that the control unit 20 operates to make a further estimate of the image which is representative of the hand drawn representation. In this way as soon as the correct image is found and presented on the visual display unit 2 the user can confirm and use this image without a requirement to complete the drawing of the hand drawn representation of this image. This therefore provides a further expedient and efficient way of generating a story board.

As will be appreciated by those skilled in the art, although the example embodiment of the present invention has been described with reference to a story board editing station, it will be appreciated that the present invention finds application in other fields, for example a universal communicator. Thus without any knowledge of a language in a country, a user may draw a representation of an object which is desired to be communicated. This further provides a means for shopping and communicating using hand drawn representations of images.

It will be appreciated that those parts of the image identification apparatus implemented as hardware could be equivalently implemented as a software computer program or computer programs being executed on an appropriate data processor. Similarly, those parts which are implemented as computer programs could equivalently be implemented as a hardware processor. As such it will be appreciated that a computer program, which when loaded onto a computer to operate as an image identification apparatus falls within the scope of the present invention. Similarly a computer program which represents instructions in accordance with the method of identifying images falls within the scope of the present invention.

We claim:

1. An image identification apparatus for identifying an image from a sequence of spatial samples generated in response to a hand drawn representation of said image, said image identification apparatus comprising:

a drawing processor having a drawing tool for use in creating said hand drawn representation of said image, wherein said sequence of spatial samples is generated in accordance with movement of said drawing tool, a segment processor arranged in operation to determine from said spatial samples stroke data representative of strokes performed in drawing said hand drawn representation of said image, a stroke pre-processor which is arranged in operation to generate parameter data from said sequence of spatial samples and the determined stroke data of the hand drawn representation, and an image identifier coupled to said stroke pre-processor which is arranged in operation to identify said image from the parameter data, wherein said segment processor operates to determine said stroke data by generating from said spatial samples relative direction information representative of a relative direction of said drawing tool, determining from said relative direction information a number of changes of direction of said tool, and determining said strokes of the hand drawn representation in accordance with the number of changes of direction.

2. An image identification apparatus as claimed in claim 1, wherein said segment processor operates to generate from said relative direction information a rate of change of direction of said tool, and determine a number of peaks in the rate of change of direct ion of the toot, said number of peaks being indicative of said number of changes of direction.

3. An image identification apparatus as claimed in claim 1 wherein said segment processor has a filter through which said relative direction information is passed, said number of times said tool changes direction being determined from said filtered relative direction information.

4. An image identification apparatus as claimed in claim 1 wherein said sequence of spatial samples are provided with a temporal reference, and said segment processor operates to determine said stroke data by generating from said temporally referenced spatial samples relative speed information from a number of said samples representative of a relative speed of said drawing tool with respect to time, determining from said relative speed information a number of changes of speed of said tool changes, and determining said strokes of the hand drawn representation in accordance with the number of changes of speed.

5. An image identification apparatus as claimed in claim 4, wherein said segment processor operates to generate from said relative speed information a rate of change of the speed of said tool, identify when the rate of change of speed reaches zero, said number of times the drawing tool changes speed being determined from which of the identified zeros in the rate of change of speed corresponds to minimum speeds.

6. An image identification apparatus as claimed in claim 4, wherein said segment processor has a filter through which said relative speed information is passed, said number of times said tool changes speed being determined from said filtered relative speed information.

7. An image identification apparatus as claimed in claim 1, wherein said segment processor operates to determine the strokes performed in drawing said hand drawn representation by combining said relative direction information and said relative speed information.

8. An image identification apparatus as claimed in claim 1 wherein said stroke pre-processor operates to determine a start and end point for each of said stokes, form an outer boundary of said hand drawn representation from said start and end points of said strokes, normalise said hand drawn representation from said outer boundary with respect to a pre-defined reference unit by proportionally adapting said spatial samples, and generate said parameter data from said normalised hand drawn representation.

9. An image identification apparatus as claimed in claim 8, wherein said parameter data includes at least one of a number of said strokes, a centre of gravity of said hand drawn representation, a mean vector of said hand drawn representation, a normalised vector of said hand drawn representation, the length of said hand drawn representation, and the balance of said hand drawn representation.

10. An image identification apparatus as claimed in claim 1 wherein said image identifier is arranged to access a data store storing a plurality of images, and to indicate which of said plurality of images corresponds to said hand drawn representation in accordance with said parameter data.

11. An image identification apparatus as claimed in claim 10, wherein said image identifier is a neural network which is trained with said parameter data corresponding to said pre-stored images, and is arranged in operation to generate a reference indication representative of which of said pre-stored images said parameter data corresponds.

12. An image identification apparatus as claimed in claim 11 wherein said neural network is a multi-layer perceptron, the number of inputs of an input layer corresponding to the number of items of parameter data, each of said items of parameter data being fed to a corresponding one of said inputs.

13. An image identification apparatus as claimed in claim 1 wherein said image identifier operates to feed data representative of said indicated image to a visual display means connectable to said apparatus to provide a representation of said image.

14. A method of identifying an image from a sequence of spatial samples generated in response to a hand drawn representation of said image, said method comprising the steps of resolving, from said samples, strokes performed in creating said hand drawn representation of said image, generating parameter data by associating said spatial samples with the resolved strokes of the hand drawn representation, and identifying said image from stroke parameter data, wherein the step of resolving said strokes performed in drawing said hand drawn representation, comprises the steps of generating from said spatial samples relative direction information representative of a relative direction of a tool used to draw said hand drawn representation, and determining from said relative direction information a number of times said tool changes direction, the strokes performed in generating said hand drawn representation being resolved in accordance with the number of changes of direction.

15. A method of identifying an image as claimed in claim 14, wherein the step of determining trials said relative direction information a number of times and tool changes direction, comprises the steps of generating from said relative direction information a rate of change of direction of said tool, and the step of determining the number of tines the drawing tool changes direction comprises the step of determining a number of peaks in the rate of change of direction of the tool.

16. A method of identifying an image as claimed in claim 14, wherein the step of resolving the strokes performed in drawing said hand drawn representation, comprises the step of filtering said relative direction information.

17. A method of identifying an image as claimed in claim 14, wherein spatial samples are provided with a temporal reference, and the step of resolving the strokes performed in drawing said hand drawn representation, comprises the step of generating from said temporally referenced spatial samples relative speed information representative of a relative speed of a tool used to draw said hand drawn representation with respect to time, determining from said relative speed information a number of changes of speed of said tool, the strokes performed in generating said hand drawn representation being resolved in accordance with the number of changes of speed.

18. A method of identifying an image as claimed in claim 17, wherein the step of determining from said relative direction information a number of changes of speed of said tool, comprises the steps of generating from said relative speed information a rate of change of the speed of said tool, and identifying a number of points at which the rate of change of speed reaches zero, and the step of determining the number of times the drawing tool changes speed comprises the step of determining which of the identified zero points correspond to minimum speeds.

19. A method of identifying an image as claimed in claim 17 wherein the step of resolving the strokes performed in drawing said hand drawn representation, comprises, before the step of determining the man her of speed changes the step of filtering said relative speed information.

20. A method of identifying an image as claimed in claim 14, wherein the step of resolving the strokes performed in drawing said hand drawn representation, comprises the step of combining the changes speed of said tool and the changes of direction of said tool.

21. A method of identifying an image as claimed in claim 14 wherein the step of generating said parameter data from said spatial samples and the resolved strokes of the hand drawn representation, comprises the steps of determining start and end points of each of said strokes, forming an outer boundary from said start and end points of said strokes, normalising said hand drawn representation from said outer boundary with reference to a pre-defined reference unit by proportionally adapting said spatial samples, and generating said parameter data from said normalised hand drawn representation.

22. A method of identifying an image as claimed in claim 21, wherein said parameter data include at least one of said number of strokes, a centre of gravity of said hand drawn representation, a mean vector of said hand drawn representation, a normalised vector of said hand drawn representation, the length of said hand drawn representation, and the balance of said hand drawn representation.

23. A method of identifying an image as claimed in claim 14 wherein the step of identifying said image from the parameter data comprises the steps of generating a reference indication from said parameter data, and selecting an image from a plurality of images in accordance with said reference indication.

24. A method of identifying an image as claimed in claim 14 wherein the step of generating said reference indication from said parameter data, comprises the step of applying the parameter data to a neural network which has been trained to said generate reference indication in accordance with which of said plurality of images most closely corresponds to said hand drawn representation of said image.

25. A method of identifying an image as claimed in claim 24, wherein said neural network is a multi-layer perceptron, the number of inputs of all input layer corresponding to the number of items of parameter data, each of said items of parameter data being fed to a corresponding one of said inputs.

26. A method of identifying an image as claimed in claim 14, wherein said image identifier operates to fed data representative of said indicated image to said visual display means which provides a representation of said indicated image.

27. A method of producing a story board representative of a sample production, comprising performing the steps of the method of identifying an image as claimed in claim 14, wherein the pre-stored images correspond to desired images of said production.

28. A computer program arranged to defined the steps of the method of identifying an image as claimed claim 14.

29. A computer readable carrier having stored thereon a computer program which is arranged to perform the steps of the method of identifying an image as claimed in claim 14, when loaded on to a computer.

30. An image identification apparatus for identifying an image from a hand drawn representation of said image, said image identification apparatus comprising a drawing processor which is arranged in use to produce said hand drawn representation and operates to generate temporally referenced spatial sample, in accordance with the hand drawn representation of said image, a segment processor coupled to the drawing processor which operates to determine from said temporally referenced spatial samples stroke data representative of strokes performed in drawing said hand drawn representation of said image, a stroke pre-processor coupled to said segment processor which operates to generate stroke parameter data by associating the temporally referenced spatial samples with the determined stroke data of the hand drawn representation, and an image identifier coupled to said stroke pre-processor which operates to identity said image from the stroke parameter data, wherein said segment processor operates to determine said stroke data by generating from said spatial samples relative direction information representative of a relative direction of a drawing tool used to generate the spatial samples, determining from said relative direction information a number of changes of direction of said drawing tool, and determining said strokes of the hand drawn representation in accordance with the number of changes of direction.

* * * * *